UNITED STATES PATENT OFFICE.

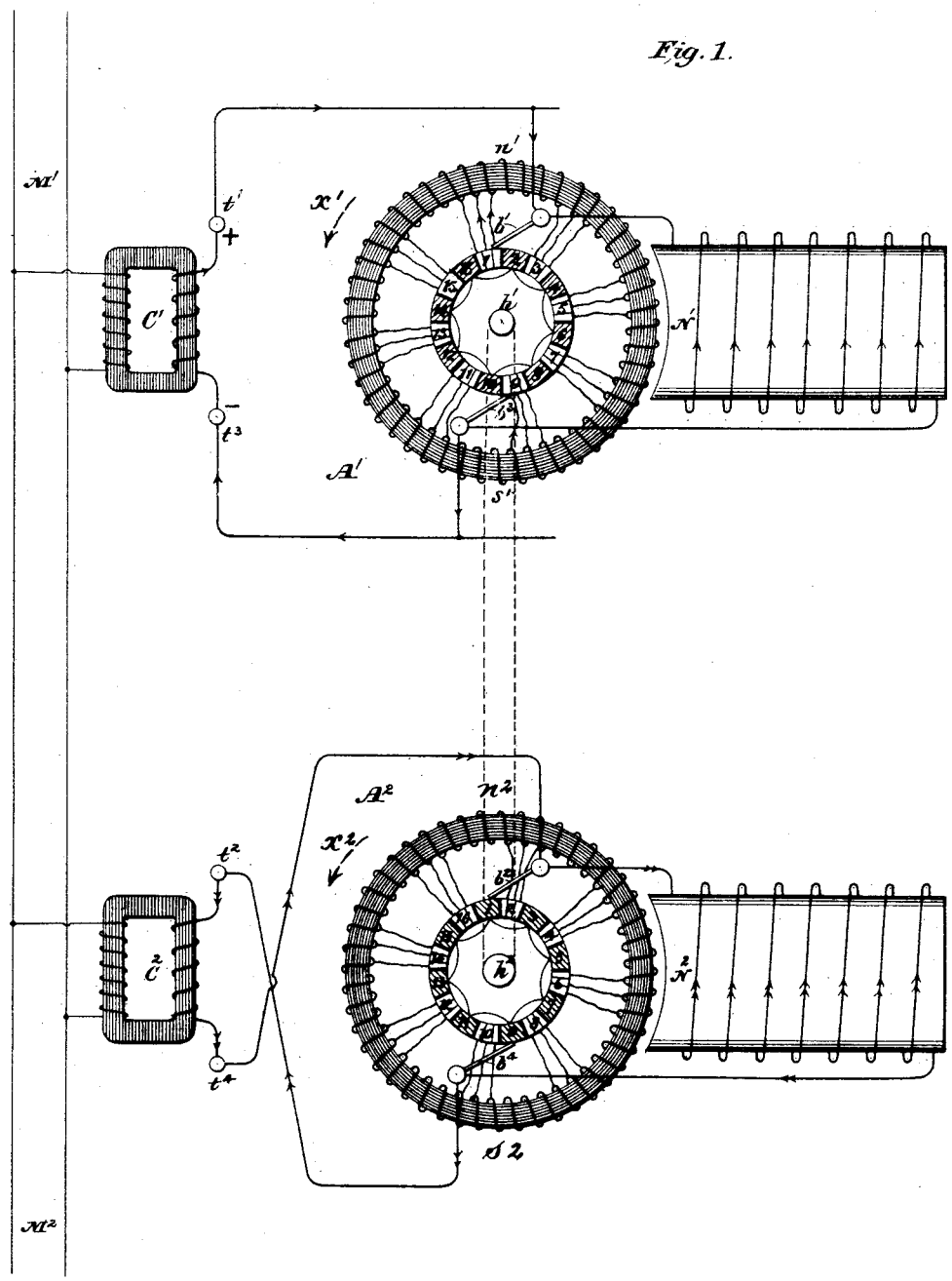

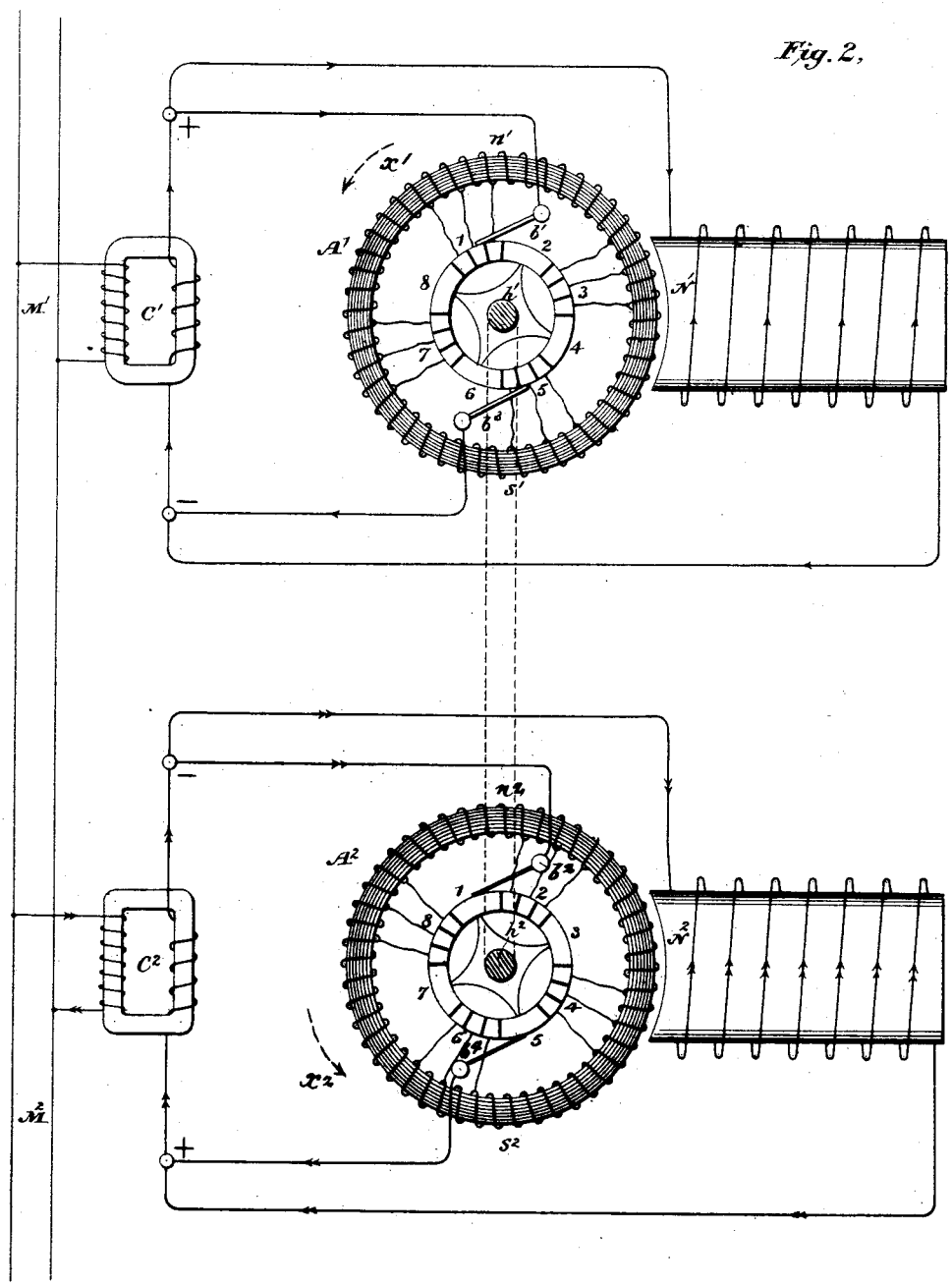

FRANCIS JARVIS PATTEN, OF NEW YORK, N. Y., ASSIGNOR, BY MESNE ASSIGNMENTS, TO THE PATTEN ALTERNATING MOTOR COMPANY, OF NEW JERSEY.

ELECTRIC MOTOR.

SPECIFICATION forming part of Letters Patent No. 445,623, dated February 3, 1891.

Application filed October 6, 1890. Serial No. 367,188. (No model.)

*To all whom it may concern:*

Be it known that I, FRANCIS JARVIS PATTEN, a citizen of the United States, residing at New York, in the county of New York, State of New York, have invented certain new and useful Improvements in Electric Motors, of which the following is a description.

My invention consists in a novel form of electric motor for alternating-current systems of electric distribution, which, by a peculiar system of connecting its various circuits, results are secured that could not otherwise be obtained.

In the drawings, Figures 1 and 2 show the operative parts and circuit-connections of my motor. The two figures illustrate machines that are nearly identical, the only difference being in the connections of the field and armature circuits to the secondary terminals of the converter, and a description of one will apply throughout to the other.

The invention and its peculiar operation rests fundamentally upon the principle combining two motors in one and connecting their circuits in such a way to the same or independent sources of energy that one machine and its circuits is operated by the successive positive impulses emanating from one source of energy, and the other is actuated by the corresponding negative impulses from another source of energy, both of which are supplied from a common primary source. The principle involved may be briefly stated as follows: One machine is actuated by the plus impulses from one source of energy by which it acquires motion, and immediately operates to short-circuit this same source of energy during the following negative impulse, thus practically cutting the first machine out of circuit during the time when its motion would normally be reversed. The other machine is correspondingly arranged to be actuated by the negative impulses emanating from the source of energy to which it is connected and likewise short-circuits the positive impulses from this source, thus cutting itself out of circuit when the tendency would normally be to drive this one backward. The two armatures of the two machines are secured to a common spindle, as a result of which, by reason of the reverse connections of one machine, as shown in Fig. 1, the constant tendency is to drive the armature continuously forward in the same direction, the two machines acting alternately in the same direction with each successive plus impulse from one converter actuating one machine and the minus impulse from the other converter in turn actuating the second, which process is repeatedly continued, resulting in a continuous motion of the spindle in the same direction without any special change of armature-connections.

The machine will be readily understood from an inspection of the diagram Figs. 1 and 2, it being understood that the armatures $A'$ and $A^2$ in the two machines, which really act as one, are fixed upon the same spindle.

Only one field-magnet pole is shown in this machine, which is sufficient to illustrate the operative circuits.

In the diagrams, $M'$ $M^2$ are the high-tension mains of an alternating-current system of distribution. $C'$ $C^2$ are converters, and $t'$ $t^2$ $t^3$ $t^4$ are the respective terminals of their secondary circuits, having low-tension currents. The machines are preferably ordinary Gramme ring-motors with a two-pole field, and differ from the ordinary direct-current machine of a similar type in that the armature-circuits are connected to the collector-segments in recurrent groups with unconnected segments between, as shown, instead of being continuously connected all the way round the ring, as is usually the case in ordinary Gramme ring-motors.

The motors have their rings continuously wound, and the ring-windings are connected to separate commutators. The machine $A'$, Fig. 1, has its commutator divided into groups numbered from 1 to 16, inclusive. The odd-numbered groups 1 3 5, &c., are cut into three segments each, while the even-numbered groups 2 4 6, &c., are left solid, and are all connected to each other, as shown. In the motor $A^2$ the reverse is the case. The odd-numbered segments 1 3 5, &c., are solid, uncut, and all connected to each other, while the even-numbered groups 2 4 6, &c., are cut into three segments each, each segment connected to the ring-winding in the ordinary way in both armatures. Now these armatures and commutators so secured upon the spindle that like-numbered groups 1 and 1, 2 and 2, 3 and 3, &c., all the way round are in a line with each other parallel to the axis of the spindle, and the brushes $b'$ and $b^3$ of the machine $A'$ are on the same line with the brushes $b^2$ $b^4$ of the machine $A^2$. From this arrangement it results that while the armature of the machine $A'$ is receiving current—say a plus impulse from the converter $C'$ through the connected segments 1 and 9 of this machine—the corresponding plus impulse emanating from the converter $C^2$, instead of going through the armature of machine $A^2$, passes to the brush $b^2$, the disconnected group 1 of this machine, which is connected to the opposite disconnected group 9 under the brush $b^4$, thus closing the secondary of the converter $C^2$ upon itself during this positive impulse, which we have seen has been made operative to actuate the armature of the machine $A'$, but is short-circuited, closing the converter on itself, through the connections of the armature of machine $A^2$. It will likewise be observed that the field-circuit of the field-magnet $N'$ is likewise in circuit and receiving current in parallel with the armature in such a direction as to produce a north pole at $N'$ during the period of time that the plus impulse is operative in this machine, and that the field-magnet circuit is closed upon itself through the connected even-numbered groups of segments during the time that a negative current is flowing, which would reverse this field-magnet and tend to reverse the motor. It will be noted that the field-magnet being closed upon itself through the short-circuited segments during every negative impulse the bad effects of self-induction which would arise from opening the field-circuit during this period are entirely obviated. At the same time, although the field-magnet is closed, it will not receive sufficient current from the converter to reverse its magnetism, because its winding offers a considerable resistance, practically amounting to infinity as compared with the direct short circuit offered the entire current from the converter through the connections of the even-numbered groups 2, 4, 6, &c. Thus the field-magnet $N'$ is energized only by recurrent impulses of positive current with intervals of zero-current during the negative impulses. What has been stated concerning the machine $A'$ with regard to the positive impulses and their action in this machine is equally applicable to the machine $A^2$, in which the negative impulses are operative, while the positive impulses operative in machine $A'$ are short-circuited in machine $A^2$, as were the negative impulses in machine $A'$. It results, therefore, that if the circuits from the terminals $t'$ and $t^3$ of the converter $C'$ are so connected to the armature as to produce a north pole at the point $m$ and a south pole at the point $s$ in the ring and a north pole at $N'$ in the field, while the positive current in this machine is operative, and the circuits from the terminals $t^2$ $t^4$ of the converter $C^2$ are likewise so connected to the circuits of machine $A^2$ that a negative impulse from this converter when operative produces a north pole at the point $n^2$ and a south pole at $s^2$ in this ring and at the same time a field polarity with this impulse, as indicated—that is, a north pole at $N^2$—then evidently the combined effect of the two machines acting as one will be to produce a continuous rotary effort upon the common spindle in the same direction as indicated by the arrows $x'$ and $x^2$. In Fig. 2 the same principle is applied and is perhaps a preferable system of connecting the circuit, the only difference being that both field-magnets and armature are here connected to the same terminals of the converter in multiple arc instead of the field being arranged as a shunt to the armature, as shown in Fig. 1. In other respects the machines are identical. It will now be understood that by a simple arrangement of armature and field-magnet connections such as here shown a motor can be constructed that will evidently be self-starting upon an alternating-current circuit, because while standing still the armature and field-magnet of one machine, say $A'$ of Fig. 2, in which the current is effective and not short-circuited, will both be reversing polarity simultaneously and continuously, thus producing a continuous tendency to rotation in one direction, the other machine being temporarily cut out of circuit by the short-circuited segments 1 3 5 7, the machine $A^2$, Fig. 2, will produce no effect.

The principle involved may be broadly stated as follows: Two ordinary direct-current machines are so combined to act intermittently and alternately as one, each in succession producing a rotary effort in the same direction upon a common spindle, and the two are so arranged that the positive impulses from one converter actuate one system of circuits, while this impulse from the other converter is short-circuited and rendered inoperative. The negative impulse from the latter is, however, rendered operative, while it is short-circuited in the first machine and rendered inoperative there. In both machines the field and converter circuits are closed upon themselves during the periods of time when the current in that machine should be inoperative, the special feature of my invention.

It is evident that any form of direct-current machine may be connected in this manner, and I do not restrict my invention to the Gramme-ring type, as shown, although for some reasons it is a preferable form for a self-starting alternating-current electric motor.

Having thus described my invention, what I claim, and desire to secure by Letters Patent, is the following:

1. An electric motor for alternating currents having two independent armatures secured to a common spindle, independent field-magnets for said armatures, separate independent circuits of supply for each armature and its corresponding field-magnet, and separate commutators or collectors for each armature, substantially as described.

2. In an alternating-current electric motor, two armatures with separate independent commutators all secured to a common spindle, the commutators being provided each with alternate groups of segments connected to the armature-winding, and segments connected to each other which short-circuit the supply-current, substantially as described.

3. In an alternating-current electric motor, two armatures having independent circuits secured to the same spindle and a separate commutator or collector for each, said commutators having alternate groups of segments that are connected to the armature-circuits and segments that are connected to each other, the commutators being so placed upon the spindle with reference to the brushes bearing on them that one armature-circuit is connected to the source of supply while the other is out of action or short-circuited, and vice versa, substantially as described.

4. An alternating-current motor consisting of two independent machines, the armatures of which are secured to a common spindle, the field-magnets being connected to separate alternating-current sources of supply, said supply-circuits being periodically and alternately short-circuited by groups of commutator-segments that are connected together and arranged to short-circuit the supply-current through the brushes, substantially as described.

5. An electric motor provided with an armature the commutator or collector of which is composed of groups of conducting-segments connected to the armature-circuit directly in the ordinary way, and additional groups of conducting-segments located between the former, but disconnected from the armature-circuit and connected to each other, substantially as described.

6. An electric motor for alternating currents having two armatures connected to a common spindle, and a commutator for each armature, each armature-circuit being connected to alternate segments or groups of segments of its commutator, and the remaining segments not connected to the armature being connected to each other, substantially as described.

7. An alternating-current electric motor having two independent armatures connected to the same spindle, said armatures having separate commutators, in both of which alternate segments or groups of segments are connected to the armature-segments, the intermediate segment or group of segments in each being connected to each other, and the armatures and commutators so placed upon the common spindle that the connected segments of one armature correspond in position with reference to the axis of the spindle with the disconnected segments of the other, and independent brushes for each armature that bear simultaneously upon the connected segments of one armature and the disconnected segments of the other, substantially as described.

8. The described method of utilizing alternating currents in the transmission of energy, which consists in converting one set of primary currents into two independent like sets of secondary currents and causing these two to successively excite the operative circuits of the same machine, substantially as described.

In testimony that I claim the foregoing as my invention I have hereunto set my hand this 3d day of October, 1890, in the presence of two witnesses.

FRANCIS JARVIS PATTEN.

Witnesses:
HOMER LEE,
A. V. HINEY.